Sept. 19, 1933.  F. CIRMAN  1,927,779
ANTISKID DEVICE
Filed Jan. 15, 1932

INVENTOR
FRANK CIRMAN
BY
ATTORNEY

Patented Sept. 19, 1933

1,927,779

UNITED STATES PATENT OFFICE 1,927,779

ANTISKID DEVICE

Frank Cirman, Rochester, N. Y.

Application January 15, 1932. Serial No. 586,741

1 Claim. (Cl. 152—14)

This invention relates to anti-skid devices for automobile tires and wheels and has for its object to provide an improved device of this kind which can be easily and quickly applied to the tire and wheel.

A further object of this invention is to provide the anti-skid device with an improved traction element for use on icy or otherwise slippery roads.

This and other objects of the invention will become more readily apparent from the detailed description of the invention which follows, reference being had to the accompanying drawing in which Figure 1 is a side elevation of the anti-skid device.

In the several figures of the drawing like reference numerals indicate like parts.

Figures 1, 2:
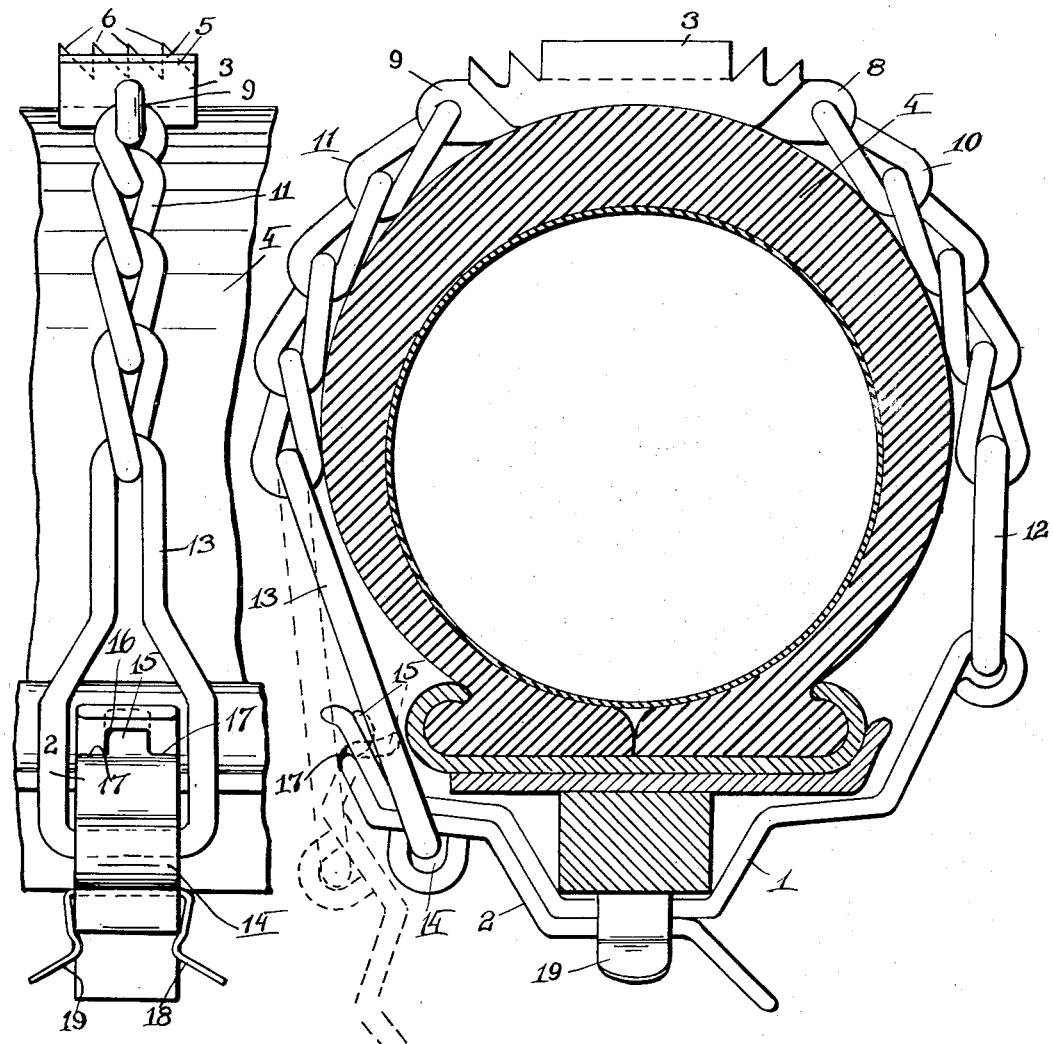
Figure 2 is an end elevation of the anti-skid device as it appears when applied to the tire and wheel, the portion of the tire and the wheel to which the device is attached being illustrated in section.
Figure 4:
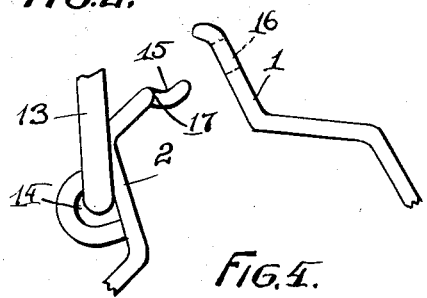
Figure 4 is a detailed view of the ends of the clamp member and the clamp lever as they appear when they are disengaged.
Figure 3:
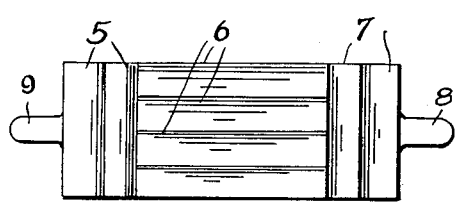
Figure 3 is a detail top plan view of the traction element of the anti-skid device.

The anti-skid device forming the subject matter of my invention comprises the clamp member 1 which includes the clamp lever 2 with which the traction member 3 is held in place over the tread of the tire 4. The traction member 3 comprises a heavy metal plate having a curved bottom which is adapted to fit over the curved surface of the tread of the tire. The top of the traction member is provided with three sets of elongated teeth 5, 6 and 7, of which teeth 6, 6 are located in the middle and extend at right angles to the perimeter of the tire, while teeth 5, 5 and 7, 7 are located on each side of teeth 6, 6 respectively and are parallel to each other and to the perimeter of the tire to which the traction member is attached.

The traction member 3 has a pair of eyes 8 and 9 provided thereon, one at each side thereof and these eyes are connected by the chains 10 and 11 to the links 12 and 13 respectively. Link 12 in turn is pivoted to the outer end of the clamp member 1, while link 13 is pivoted in the eye 14 provided on the under side of the clamp lever 2.

The clamp lever 2 is hinged to the clamp member by means of the lug 15 which is in engagement with the opening 16 provided near the end of the clamp member. The lug 15 is reduced in width so that a shoulder 17 is formed on each side of the lug on the clamping lever and these two shoulders allow the lever to be rocked on the clamp member while the lug 15 remains in engagement with the clamp member and prevents the disengagement of the lever from the clamp member.

The clamp lever 2 may thus be swung from its full line or locking position illustrated in Figure 2 to the left thereof as indicated in the dotted lines. The locking lever is thus gradually swung away from the clamping member and releases its tension on the chain 11 and tread member 3 until the lever is finally placed in such a position in which the lug 15 thereof may be pulled out of engagement with the hole 16 in the clamp member 1. The locking lever is thus completely disengaged from the clamp member which is then free to drop away from the rim of the wheel to release the chains 11 and 12 with the tread member 3 between them so that the anti-skid device may be completely removed from the wheel and tire. A reversal of this operation will place the anti-skid device back onto the tire and wheel.

In its locked position the locking lever is held in place between two spring fingers 18 and 19 which form part of an inverted U-shaped spring bracket which is suitably fastened to the clamp member in the position illustrated in Figures 1 and 2.

The tread member 3 may be attached to antiskid chains in place of the cross links.

I claim:

A tread member for an anti-skid device comprising a plate, parallel elongated teeth extending partway across said plate intermediate thereof, said teeth being inclined in one direction on one side thereof and being vertical on the opposite side thereof, parallel elongated teeth extending at right angles to said first mentioned teeth and being of reduced height thereto, said second mentioned teeth being located at each end of said first mentioned teeth and being inclined outwardly therefrom with a straight vertical side provided on the outside of each tooth.

FRANK CIRMAN.